H. COANDA.
PROPELLER.
APPLICATION FILED MAY 29, 1911.
1,104,963.
Patented July 28, 1914.
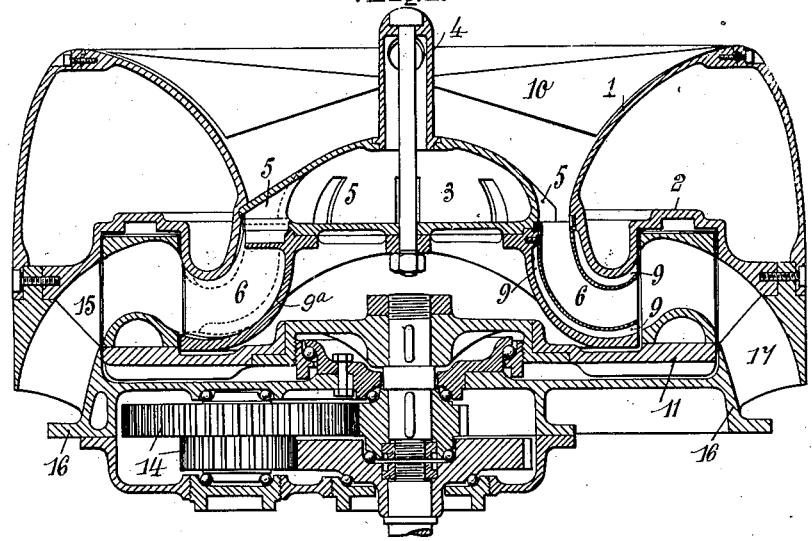
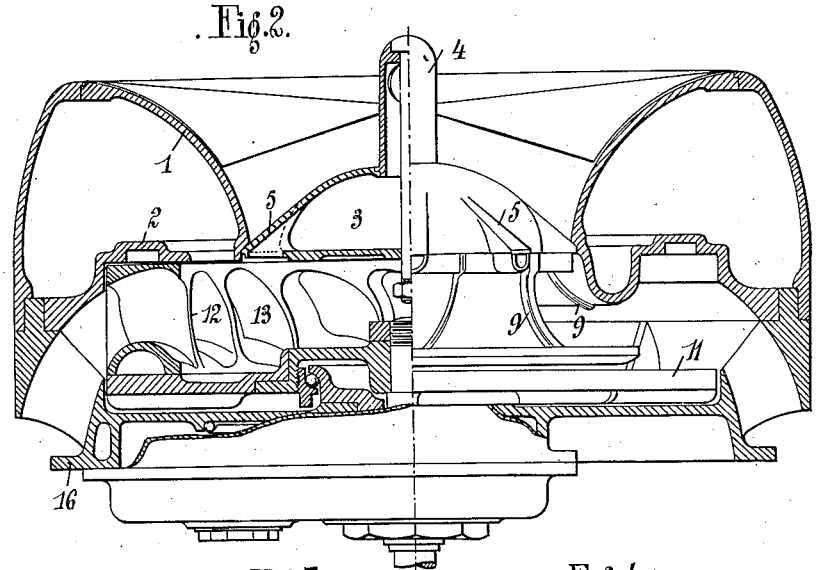
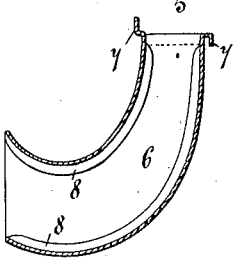
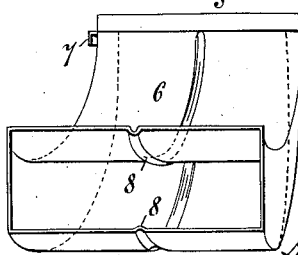

UNITED STATES PATENT OFFICE.

HENRI COANDA, OF PARIS, FRANCE.

PROPELLER.

1,104,963.  Specification of Letters Patent.  Patented July 28, 1914.

Application filed May 29, 1911. Serial No. 630,187.

*To all whom it may concern:*

Be it known that I, HENRI COANDA, subject of the King of Roumania, residing at Paris, France, have invented certain new and useful Improvements in Propellers, of which the following is a specification.

The usual form of screw propeller works by virtue of the resistance offered by the air to the rotating blades, the said air driven in a direction parallel to the propeller, exercising a pressure on the blade, so that the sum of the whole of these pressures produces the thrust of the propeller. This thrust being in proportion to the square of the speed, will therefore be produced chiefly at the circumference of the screw, while in the center there will be produced a comparative vacuum which is called the "cavitation" phenomenon. These propellers cannot travel faster than a certain maximum speed determined by their pitch and angular velocity. If, therefore, these propellers are mounted on a properly designed apparatus to be driven, the acceleration that can be communicated to the apparatus, will be limited by the screw which cannot move more quickly than it is allowed to do by its pitch.

This invention relates to a new propeller which can work, like screws, in any suitable fluid, and transform the movement of rotation about its axis, into a movement of advance parallel to the said axis.

This propeller differs from the usual screw propeller by the fact that it is independent of the movement or of the speed of the movable body, and that it acts by reaction. By producing a comparative vacuum, and increasing the pressure of the air which it utilizes, the propeller produces a difference of pressure which will tend to equalize itself. If the direction of the fluid in movement, is suddenly changed, its speed is destroyed, and its pressure becomes maximum. By designing the propeller so that this pressure is axial, the sum of the parallel pressures will produce a resultant in the direction of the axis of the said propeller. By modifying the said axial pressure, it is possible to obtain variations in the propelling power, and consequently, in the speed of the movable body driven by the propeller. Moreover, by causing an identical propeller to act so that its variable axial thrust is in the opposite direction to that of the driving propeller, a progressive or gradual braking can be obtained. In order to obtain such a propeller, the fluid jets escaping from the center of the propeller toward its circumference, pass through fixed or movable conduits of suitable direction and variable cross-section, which can be compared to the constituent elements of a turbine or of a fan, but differ from the same by the fluid which is compressed in the said propeller, having to transmit its kinetic energy to the apparatus in the form of an axial reaction and to escape from the diffusing apparatus.

In the accompanying drawings given by way of example, Figure 1 is a vertical section of the whole of the propeller, in which the axis of action and of advance is assumed to be vertical, but can be any desired. Fig. 2 is an outside half-view of the movable blades and of the distributer. Figs. 3 and 4 are respectively a cross-section and front elevation of one element of the distributer.

According to this invention the propeller comprises, following the direction of the fluid jets flowing through the apparatus: (I) a distributer, (II) movable blades, (III) a discharge diffuser.

I. The distributer comprises an inlet 1 in the shape of a bell-mouth, the inner flange of which constitutes the casing of the distributing conduits proper, and of the movable blades. The circular chamber 2 in which the blades move, is comprised between two coaxial surfaces, the common axis of revolution of which coincides with the axis of the propeller. At the minimum cross-section of the inlet, at which the distributing conduits terminate, is arranged the bottom of a hollow hemi-spherical body 3, to the upper part of which is secured a socket 4, also hollow. The hemi-spherical body 3 between which and the outer surface of the bell-mouth 1, a circular section is produced for the passage of the fluid, is provided with hollow radial extensions 5, the upper wall of which, tangential to that of the spherical body 3 in which the said extensions are inserted, extends to the wall of the inlet into which they fit. The radial extensions 5, are merely stiffening members, and in order not to interfere with the flow of air, they are arranged between the distributing conduits proper 6. These conduits have thin walls which are good conductors of heat and are made in the shape of boxes rectangular in cross-section gradually increasing in width and in height (Figs. 3 and 4) from the inlet 1 toward the movable blades. The plane of the outlet of the distributing conduits is parallel to the axis of the propeller and the walls of the conduits rise after having been suitably curved, so that the direction of the jets, tangential to the said walls, at their escape from the distributer, is directed toward the front of the propeller and forms an angle with the axis. The distributing conduits have the flanges of the opening facing the inlet 1 bent over, so as to form fasteners 7 engaging under the edges of the openings of the radial extensions 5 of the central body 3, between which the said distributing conduits 6 are arranged. Their curved faces are moreover provided respectively with a stamped groove 8 engaging with projections 9 of corresponding shape provided on the wall of the casing of the conduit of the inlet 1, and on the corresponding outer wall of a bell-shaped member 9$^a$ inverted relatively to the inlet 1, the base of the said member terminating at the inner limits of the movable blades. In the bell mouth 1 of the inlet, are moreover arranged radial blades 10, helical or not, dividing the fluid jets and giving them a suitable direction for their admission to the distributing conduits.

II. The movable blades are mounted on a disk 11 at a right angle to the axis of rotation, and are comprised between two coaxial cylindrical surfaces. The blades through which the jets of fluid pass from the interior outward, are constituted by a series of helical partitions 12 forming passages 13, the circumferential cross-sections of which gradually increase. The upper outline continues that of the distributer, and is then curved backward and connected to the diffuser, the lower outline also continues the corresponding outline of the distributer, is curved toward the center of the cross-section of the blades and also connected to the diffuser by an arc of a large radius of curvature approaching a tangent in profile. The disk 11 supporting the blades, the inlet and outlet openings of which are thus parallel to the axis of rotation, is driven by the engine either directly or by means of any suitable reducing gearing 14.

III. The diffuser 15 is constituted by the extension of the casing forming the inlet 1—this portion not being provided with any guide blades and corresponding directly to the outlet of the movable blades—and by a ring 16 provided with a conduit of gradually increasing cross-section arranged obliquely in the direction opposite to that of the inlet and provided with guide blades 17 directing the liquid jets to the exhaust after utilization.

The working of the propeller thus constructed, is as follows: The fluid in which the propeller acts, under the suction, produced by the rotation of the movable blades 12, rushes into the inlet 1 and passes into the distributing conduits 6 which direct it, after contraction and subsequent expansion, toward the said blades 12. The fluid which is brought back to the front of the propeller, impinges against the upper side of the blades where it is stopped, whereby its kinetic energy is converted into potential energy, the work absorbed by the blades constituting the axial reaction which acts in a direction parallel to the axis of rotation, in order to communicate its speed to the movable body. The fluid is thence directed to the diffuser 15 which discharges it.

In order to improve the efficiency, the distributing conduits 6 are heated so as to cause an increase of pressure of the fluid passing through them, which is later recovered on the movable blades 12. For this purpose any heating agent, for instance the cooling water of the engine, can be circulated around the distributing conduits 6, thus avoiding the use of a radiator. But more particularly in the case of aerial propellers, it is preferable to use the exhaust gases from the engine, supplying these gases to the socket 4 forming the hollow point of the propeller. These gases collected by the hemispherical body 3, are distributed by the hollow radial extensions 5 between the walls of the conduits 6, so that, in addition to the exchange of heat obtained, these hot gases under pressure act also on the movable blades 12 and produce a fall of pressure which assists the escape of the fluid at the outlet of the distributer. As a result of the reverse action due to the suction produced by the escape of the fluid, the exhaust gases are also drawn in by the movable blades, so that the back pressure in the engine is destroyed, and can be reduced below atmospheric pressure, similar to the vacuum produced by the condenser of steam engines, which improves the efficiency of the propeller and motor group.

In order to avoid an excessive fall of temperature of the exhaust gases in the collector, before being used by injection in the distributer, the body 3 could be provided with a non-conducting covering, for instance protected by a circulation chamber for the cooling water of the engine, surrounding the same wholly or in part.

The propeller described can of course be applied to any vehicle such as an aeroplane, ship, motor car, etc. It acts equally well by traction or thrust, and it may be combined with an adjustable diaphragm mounted in the bell mouth of the inlet, or in any other suitable manner, so as to vary the volume of the fluid admitted and thus to vary the axial reaction and the speed of the apparatus to be driven. The propeller thus acts as a gradual change speed gear.

By arranging as indicated a second propeller on the device to be driven, so that its axial pressure acts in the direction opposite to that of the forwardly driving propeller, a gradual braking can be obtained. These arrangements can be advantageously applied to motor vehicles. The motor and the transmitting gear are then reduced to an ordinary engine driving a front propeller which is run at variable speeds, and a rear propeller rotating idly normally behind its closed diaphragm without producing any reaction. The more or less great opening of the diaphragm of the said propeller, makes it possible to produce variable axial reactions opposing the forward movement. In that way, the transmission of movement to the wheels, the differential, the brakes on the rear wheels, the cooling fan, etc., are done away with.

What I claim as my invention and desire to secure by Letters Patent is:—

1. In an aerial propeller, the combination with a bell-shaped suction inlet, of a central hollow body in the said bell, a fixed inlet distributer of increasing cross-section, terminating on the one hand at the annular suction cross-section arranged in a plane normal to the axis of the propeller, between the walls of the suction inlet and of the central body, and on the other hand, at a central cylindrical surface coaxial with the axis; movable vanes or buckets arranged on a disk driven by the engine and comprised between cylindrical surfaces coaxial with the axis; and a fixed discharge diffuser with increasing cross-section, comprised between a cylindrical surface coaxial with the axis and a plane at a right angle to the latter.

2. In an aerial propeller, the combination with a suction inlet in the shape of a bell, of guide ribs and a hollow body in said bell, an inlet distributer, distributing boxes in the said distributer, limited by flat lateral surfaces and forming free spaces between their curved walls and those of the distributer; vanes movable relatively to the said distributer and consisting of a ring in which are cut oblique blades with reactional front surfaces; and a discharge diffuser with guide blades.

3. In an aerial propeller, the combination with a hollow suction inlet forming a radiator for the engine, of conduits connecting a central hollow body arranged in the suction inlet, to the exhaust of the said engine, openings in the wall of the hollow body, radial conduits forming extension of the body and enabling hot gases to circulate between the walls of the hollow suction inlet and the boxes with which the latter is provided.

In testimony whereof I have signed my name to this specification in the presence of two subscribing witnesses.

HENRI COANDA.

Witnesses:
H. C. COXE,
GEORGES BONNEUIL.